US008793256B2

(12) United States Patent
McIntire et al.

(10) Patent No.: US 8,793,256 B2
(45) Date of Patent: Jul. 29, 2014

(54) METHOD AND APPARATUS FOR SELECTING RELATED CONTENT FOR DISPLAY IN CONJUNCTION WITH A MEDIA

(75) Inventors: John P. McIntire, Palo Alto, CA (US); David W. J. Stringer-Calvert, Santa Clara, CA (US)

(73) Assignee: Tout Industries, Inc., San Francisco, CA (US)

( * ) Notice: Subject to any disclaimer, the term of this patent is extended or adjusted under 35 U.S.C. 154(b) by 224 days.

(21) Appl. No.: 12/343,947

(22) Filed: Dec. 24, 2008

(65) Prior Publication Data

US 2009/0248672 A1 Oct. 1, 2009

Related U.S. Application Data

(60) Provisional application No. 61/039,787, filed on Mar. 26, 2008, provisional application No. 61/054,636, filed on May 20, 2008, provisional application No. 61/079,013, filed on Jul. 8, 2008.

(51) Int. Cl.
*G06F 7/00* (2006.01)
*G06F 17/30* (2006.01)
(52) U.S. Cl.
CPC .................................. *G06F 17/3002* (2013.01)
USPC ............................................ 707/741; 725/41
(58) Field of Classification Search
CPC .................................................. G06F 17/3002
USPC ................... 707/741; 725/105, 32–36, 41–44
See application file for complete search history.

(56) References Cited

U.S. PATENT DOCUMENTS

| | | | |
|---|---|---|---|
| 5,446,919 | A | 8/1995 | Wilkins |
| 6,154,771 | A | 11/2000 | Rangan et al. |
| 6,269,366 | B1 | 7/2001 | Romano et al. |
| 6,357,042 | B2 | 3/2002 | Srinivasan et al. |
| 6,466,275 | B1 | 10/2002 | Honey et al. |
| 6,567,980 | B1 | 5/2003 | Jain et al. |
| 6,816,201 | B1 | 11/2004 | Fang et al. |
| 6,864,886 | B1 | 3/2005 | Cavallaro et al. |
| 6,876,970 | B1 | 4/2005 | Silver et al. |
| 6,877,134 | B1 | 4/2005 | Fuller et al. |
| 7,035,624 | B2 | 4/2006 | Maegawa |

(Continued)

FOREIGN PATENT DOCUMENTS

| | | |
|---|---|---|
| CN | 101278311 A | 10/2008 |
| JP | 2003-022346 A | 1/2003 |

(Continued)

OTHER PUBLICATIONS

International Search Report and Written Opinion for PCT/US07/65719, Feb. 27, 2008.

(Continued)

*Primary Examiner* — Cheyne D Ly

(57) ABSTRACT

In one embodiment, the present invention is a method and apparatus for selecting related content for display in conjunction with a media. One embodiment of a method for selecting related content for display in conjunction with a media, where the media includes a primary media and a secondary media that is time-synchronized with the primary media, includes retrieving one or more items of metadata associated with the media, selecting at least one item of related content based on the metadata, and displaying the related content substantially simultaneously with display of the media.

21 Claims, 6 Drawing Sheets

(56) References Cited

U.S. PATENT DOCUMENTS

| | | | |
|---|---|---|---|
| 7,051,275 | B2 | 5/2006 | Gupta et al. |
| 7,068,309 | B2 | 6/2006 | Toyama et al. |
| 7,162,696 | B2 | 1/2007 | Wakefield |
| 7,539,951 | B1 * | 5/2009 | Molander et al. ............ 715/853 |
| 8,645,991 | B2 | 2/2014 | McIntire et al. |
| 2001/0027412 | A1 | 10/2001 | Son |
| 2002/0049983 | A1 | 4/2002 | Bove, Jr. et al. |
| 2002/0073423 | A1 | 6/2002 | Krakirian |
| 2002/0078446 | A1 | 6/2002 | Dakss et al. |
| 2002/0083468 | A1 | 6/2002 | Dudkiewicz |
| 2002/0107735 | A1 | 8/2002 | Henkin |
| 2002/0108112 | A1 | 8/2002 | Wallace et al. |
| 2002/0170068 | A1 | 11/2002 | Rafey et al. |
| 2003/0009380 | A1 | 1/2003 | Suzuki et al. |
| 2003/0023562 | A1 | 1/2003 | Bailey et al. |
| 2003/0070167 | A1 | 4/2003 | Holtz |
| 2003/0093790 | A1 * | 5/2003 | Logan et al. .................. 725/38 |
| 2003/0128759 | A1 | 7/2003 | Prakash et al. |
| 2003/0220866 | A1 | 11/2003 | Pisaris-Henderson et al. |
| 2004/0098743 | A1 | 5/2004 | Gutta et al. |
| 2004/0148563 | A1 | 7/2004 | Lord et al. |
| 2004/0172593 | A1 | 9/2004 | Wong et al. |
| 2004/0189704 | A1 | 9/2004 | Walsh et al. |
| 2005/0015815 | A1 | 1/2005 | Shoff et al. |
| 2005/0044078 | A1 | 2/2005 | deVries et al. |
| 2005/0060229 | A1 | 3/2005 | Riedl et al. |
| 2005/0076359 | A1 | 4/2005 | Pierson et al. |
| 2005/0097451 | A1 | 5/2005 | Cormack et al. |
| 2005/0203800 | A1 | 9/2005 | Sweeney et al. |
| 2005/0228665 | A1 | 10/2005 | Kobayashi et al. |
| 2005/0246625 | A1 | 11/2005 | Iyengar |
| 2005/0278747 | A1 | 12/2005 | Barton et al. |
| 2006/0015378 | A1 | 1/2006 | Mirrashidi et al. |
| 2006/0015925 | A1 | 1/2006 | Logan |
| 2006/0026067 | A1 | 2/2006 | Nicholas |
| 2006/0041926 | A1 | 2/2006 | Istvan et al. |
| 2006/0123451 | A1 | 6/2006 | Preisman |
| 2007/0038931 | A1 * | 2/2007 | Allaire et al. ................ 715/526 |
| 2007/0061309 | A1 | 3/2007 | Klein, Jr. |
| 2007/0077921 | A1 | 4/2007 | Hayashi et al. |
| 2007/0078714 | A1 * | 4/2007 | Ott et al. ........................ 705/14 |
| 2008/0209465 | A1 | 8/2008 | Thomas et al. |

FOREIGN PATENT DOCUMENTS

| | | | |
|---|---|---|---|
| JP | 2004-304792 | A | 10/2004 |
| KR | 10-2002-0084223 | A | 11/2002 |
| KR | 10-2004-0033766 | A | 4/2004 |
| WO | WO9926415 | | 5/1999 |
| WO | WO 02-077750 | A2 | 12/2005 |
| WO | WO 2005/114519 | | 12/2005 |
| WO | 1757032(A) | | 4/2006 |
| WO | WO 2007/041073 | A1 | 4/2007 |

OTHER PUBLICATIONS

"2007—The Year of Online Video Tools and Video Monetization", *6initiative,* ) Feb. 1, 2007, <http://www.6initiative.com/2007-the-year-of-online-video-tools-and-video-monetization/>; consists of 3 unnumbered pages.

"FAQ Spot", *Mojiti*, Feb. 13, 2007, http://mojiti.com/faq/spot; consists of 8 unnumbered pages.

Lu, Gang, "Mojiti—China's YouTube 2.0 Adds Annotation to Mix", Jan. 24, 2007. http://www.readwriteweb.com/archives/mojiti_china_youtube20.php; consists of 2 unnumbered pages.

Sanzalone, Robert, "Video With Annotations—Mojiti vs. Viddler", Dec. 22, 2003, http://www.pacificit.ca/article/206; consists of 1 unnumbered page.

International Search Report and Written Opinion for PCT/US2009/037716, Oct. 23, 2009, consists of 9 pages.

Supplementary Search Report for PCT/US 2007/065719, May 28, 2010, consists of 8 unnumbered pages.

Search Report for EP 09725385.0, Mar. 15, 2013, consists of 6 pages.

Aug. 30, 2012 Office Action in CN 200980110881.X, SRI International, Applicant, 11 pages.

Jun. 4, 2012 Office Action in JP 2009-503323, SRI International, Applicant, 4 pages.

English Translation of Written Questioning in Japanese Patent Application U.S. Appl. No. 2009-503323, mailed Dec. 5, 2013, docketed Jan. 20, 2014, consists of 4 pages.

Chinese Office Action dated Jan. 24, 2014 from corresponding Chinese application No. 200980110881.X, pp. 1-17.

* cited by examiner

METHOD AND APPARATUS FOR SELECTING RELATED CONTENT FOR DISPLAY IN CONJUNCTION WITH A MEDIA

CROSS REFERENCE TO RELATED APPLICATIONS

This application claims the benefit of U.S. Provisional Patent Application No. 61/039,787, filed Mar. 26, 2008; U.S. Provisional Patent Application No. 61/054,636, filed May 20, 2008; and U.S. Provisional Patent Application No. 61/079,013, filed Jul. 8, 2008, all of which are herein incorporated by reference in their entireties.

FIELD OF THE INVENTION

The present invention relates generally to the field of media distribution, and more specifically relates to the selection and display of related content in conjunction with a media.

BACKGROUND OF THE DISCLOSURE

In many situations, it is advantageous to display related content substantially in conjunction with a media, such as, for example, when displaying advertising content on the same World Wide Web ("Web") page as a content creator-provided video. In this context, an important goal is to increase the likelihood that the advertising content will compel a consumer to purchase the advertised product. Hence, it is advantageous to select the advertising content (e.g., out of a library of available advertising content) that is most "relevant" to a user viewing the media (e.g., a content creator-provided video) that is displayed on the Web page, as relevant advertising is more likely to elicit from the user the behavior that the advertiser desires.

Conventional methods for selecting and displaying related content focus on "what" the media is about (i.e., the subject matter). For example, some methods base the selection on keyword extraction (i.e., extracting a set of words from the text displayed on a Web page on which advertising is to be presented). This makes the selection task particularly difficult when the media is a video, because videos contain images (and, frequently, sound), not text, and are thus not easily searchable using these conventional methods. Such naïve methods currently in use are therefore only minimally effective and can result in unfortunate advertising placements; for example, by displaying a sports utility vehicle (SUV) advertisement in conjunction with a video discussing how SUVs contribute to global warming, by matching against the extracted text of "SUV."

Moreover, simply knowing the general subject matter of a media (and that itself may be difficult to determine with certainty) may be only minimally helpful due to the fact that "general" subject matter can encompass a diverse range of "specific" subject matter, and advertising content well-targeted to the general subject matter may be irrelevant to the specific subject matter. For example, knowing that a video pertains to "snowboarding" may be somewhat useful with respect to selecting and displaying related advertising content, but it is far more useful if the selection can differentiate between a media involving a famous snowboarder demonstrating a new snowboard, and media displaying the snowboard-related amenities at a specific ski resort. This determination of specific "relevancy" to a user is difficult to make.

SUMMARY OF THE INVENTION

In one embodiment, the present invention is a method and apparatus for selecting related content for display in conjunction with a media. One embodiment of a method for selecting related content for display in conjunction with a media, where the media includes a primary media and a secondary media that is time-synchronized with the primary media, includes retrieving one or more items of metadata associated with the media, selecting at least one item of related content based on the metadata, and displaying the related content substantially simultaneously with display of the media.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
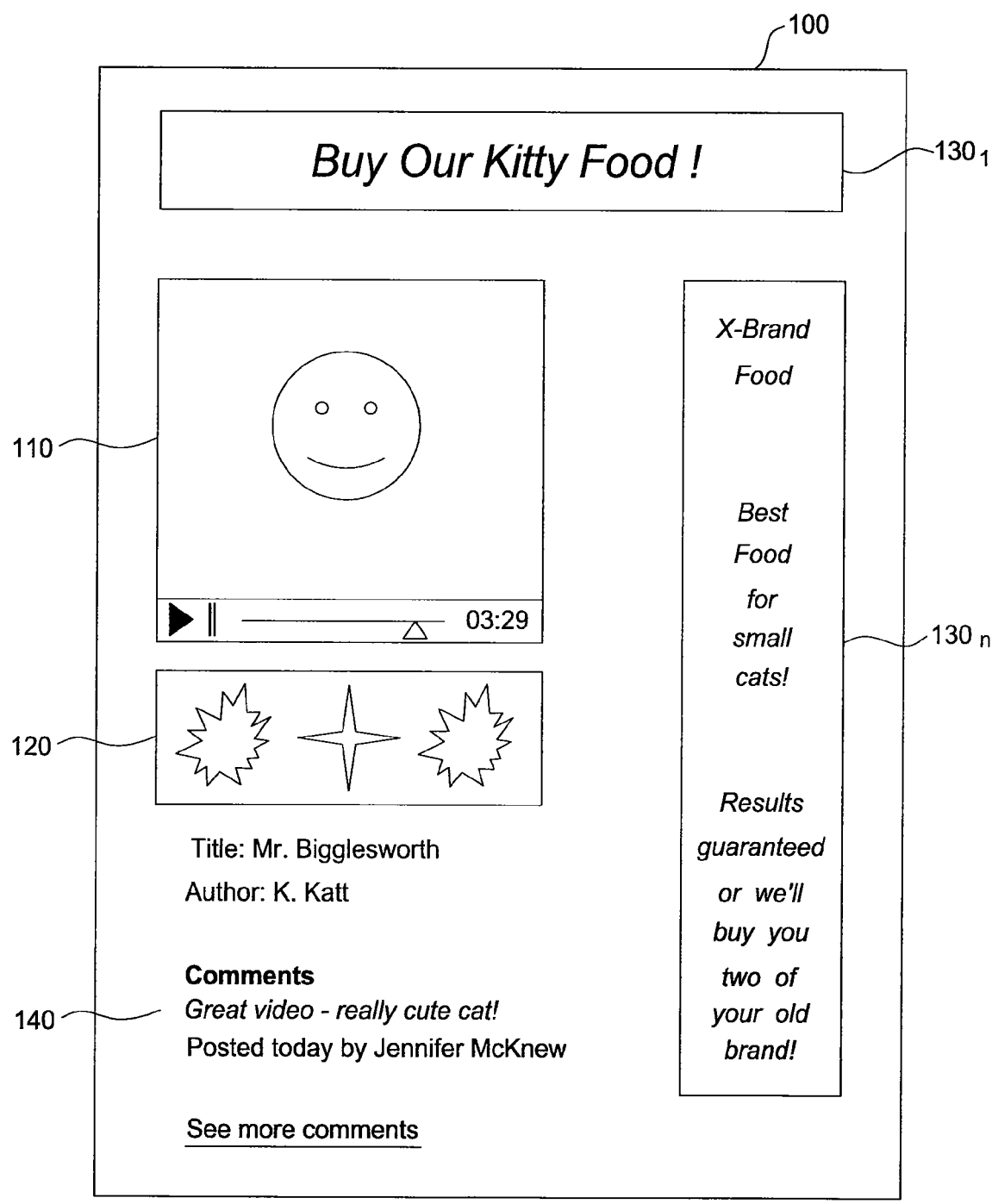
FIG. 1 depicts an exemplary embodiment of a display comprising a primary media, an optional secondary media, one or more items of related content, and other information, such as title and author of the primary media, user comments, and ratings.

FIG. 1 depicts an exemplary embodiment of a display 100 comprising a primary media 110, an optional secondary media 120, one or more items of related content $130_1$-$130_n$ (hereinafter collectively referred to as "items of related content 130"), and other information 140, such as title and author of the primary media 110, user comments, and ratings. One object of the present invention is to determine, from a selection of available related content (e.g., advertising content), which item(s) of related content 130 would be most advantageously displayed in conjunction with a primary media 110, which may be accompanied by an optional secondary media 120. Deployment scenarios for which the present invention may be used, using the example of FIG. 1, are discussed in further detail below.

In one aspect, embodiments of the invention leverage the fact that when a content creator associates a secondary media with a primary media (to form what is collectively referred to as "the media"), a relevance of the secondary media to the primary media is signified (as used herein, "content creator" is not necessarily the author of the media, but is the person who provides media and/or creates associations between primary and secondary media). The content creator's indication of relevance can be used to identify additional information ("related content," e.g., advertisements) that relates to the secondary media. Thus, in one aspect, the present invention leverages human involvement in content creation to accomplish a greater level of relevancy than is possible using conventional automated methods. This is particularly helpful when the characteristics (e.g., subject matter) of a secondary media are relatively more known or knowable than are the characteristics of a primary media. Moreover, embodiments of the present invention effectively accomplish this result regardless of a content creator's conscious awareness of the "relevancy factor" that he or she has created by making the association. In further embodiments, the present invention continues to examine information about a primary media even after a relevance to a secondary media is established.

In one embodiment, the primary media 110 in the exemplary display 100 is a video. In one embodiment, the primary media 110 is comprised of a plurality of components that are either all of a common form of media (e.g., all components are frames of a video, temporal regions of an audio stream, slides in a slideshow, or the like) or of two or more than forms of media (e.g., a multimedia presentation in which still image components are interspersed with video components, a video component with an audio soundtrack component, or the like). In another embodiment, the primary media 110 comprises just a single component (e.g., a single photographic image).

Components of the primary media 110 are displayed in any number of sequence types such as, for example, in accordance with a pre-established sequence (e.g., component A is always followed by component B), in a random sequence, in a sequence that is determined in whole or in part by a directed selection process (e.g., each user of the primary media 110 may select a preferred component display sequence), or in a sequence that is determined by an automated process by reference to specified characteristics of the components (e.g., components that have been rated more favorably by past users are displayed earlier in the sequence to later users).

In certain embodiments, such as that shown in FIG. 1, the primary media 110 has an associated secondary media 120. The secondary media 120 comprises one or more items of supplemental content that may, for example, enhance the viewing experience of the primary media 110 by providing time-synchronized images, subtitles, maps, internet functionality, and so on. Additional description of various approaches to creating a secondary media and associating it with a primary media is described in co-pending, commonly assigned U.S. patent application Ser. No. 11/694,836 to McIntire et al., filed Mar. 30, 2007 (the "McIntire Application"), the contents of which are herein incorporated by reference in their entirety. FIGS. 19A-19D of the McIntire Application, for example, illustrate various possible ways in which a secondary media can be associated with a primary media. In one embodiment, the secondary media 120 contains one or more items of supplemental content, such as static media (e.g., an image, a subtitle, or the like) and dynamic media (e.g., a video, an animated image, an interactive computer application, or the like), or a combination of static and dynamic media. Items of supplemental content within the secondary media 120 may be displayed in any number of sequence types such as, for example, in accordance with a pre-established sequence, in a random sequence, in a sequence that is determined by a content creator-directed selection process, or in a sequence that is determined by an automated process by reference to specified characteristics of the items of secondary media.

The secondary media 120 is illustrated in FIG. 1 as being located adjacent to and the below primary media 110. However, the secondary media 120 may be displayed in any number of spatial locations relative to the primary media 110. Alternative placements of the secondary media 120 relative to the primary media 110 include, for example, an overlay relationship (e.g., the secondary media 120 is displayed as a subtitle displayed over a video component of the primary media 110) or in an independent relationship (e.g., the secondary media 120 is displayed substantially adjacent to the primary media 110, or the secondary media 120 is displayed in an entirely different location, such as on a Web page other than a Web page on which the primary media 110 is displayed).

In some embodiments, the display of the primary media 110 and the display of the secondary media 120 are synchronized. For example, items of supplemental content contained in the secondary media 120 may be time-synchronized to display at a specific time relative to the primary media 110 (e.g., a supplemental content item A in the secondary media 120 is displayed for thirty seconds starting after the first two minutes that the primary media 110 is displayed, irrespective of the display sequence of the various components of the primary media 110), time-synchronized with a component of primary media 110 (e.g., a supplemental content item A in the secondary media 120 is displayed for ten seconds after the first twelve seconds that component Z of the primary media 110 is displayed), on an arbitrary basis, or as determined by an automated process by reference to specified characteristics (e.g., components of the secondary media 120 that have elicited favorable user responses from past users are displayed earlier in the temporal sequence to later users).

In one embodiment, at least one of the primary media 110, secondary media 120, and related content 130 includes internet functionality, such as an interactive application. For example, the internet functionality may comprise a voting mechanism (e.g., "click here to rate this video on a scale from one to ten") or a shared application or data (e.g., "click here to download this wallpaper or ringtone to your cell phone"). In this case, the media (and, perhaps, the related content) are further associated with a "landing page" that supports this additional functionality. For instance, in the voting example, the landing page might be configured to collect, aggregate, and display user votes; in the wallpaper/ringtone example, the landing page might be configured to accept a user cell phone number and a selection of a specific instance of wallpaper or ringtone.

Code to enable interaction with an associated landing page or "backend" may be presented to the content creator at the time that the content creator uploads the media (or creates the primary/secondary media association). Depending on the type of functionality that the content creator is seeking (e.g., voting), the content creator may be presented with several potential implementation options (e.g., "display voting results as a pie chart or a bar graph?"). As the content creator customizes this functionality, those choices will simultaneously shape the backend and the code that is ultimately embedded in the media/related content combination.

In addition, this backend may evolve over time. For instance, if demographic information is collected from users of a particular media (or media and related content combination), the demographic information can be used to transmit an automated update to the backend. As an example, if the demographic data shows that the users are predominantly pre-teen females, the backend may change the color scheme of the internet functionality (e.g., change the bars of a bar graph to shades of pink).

Figure 2:
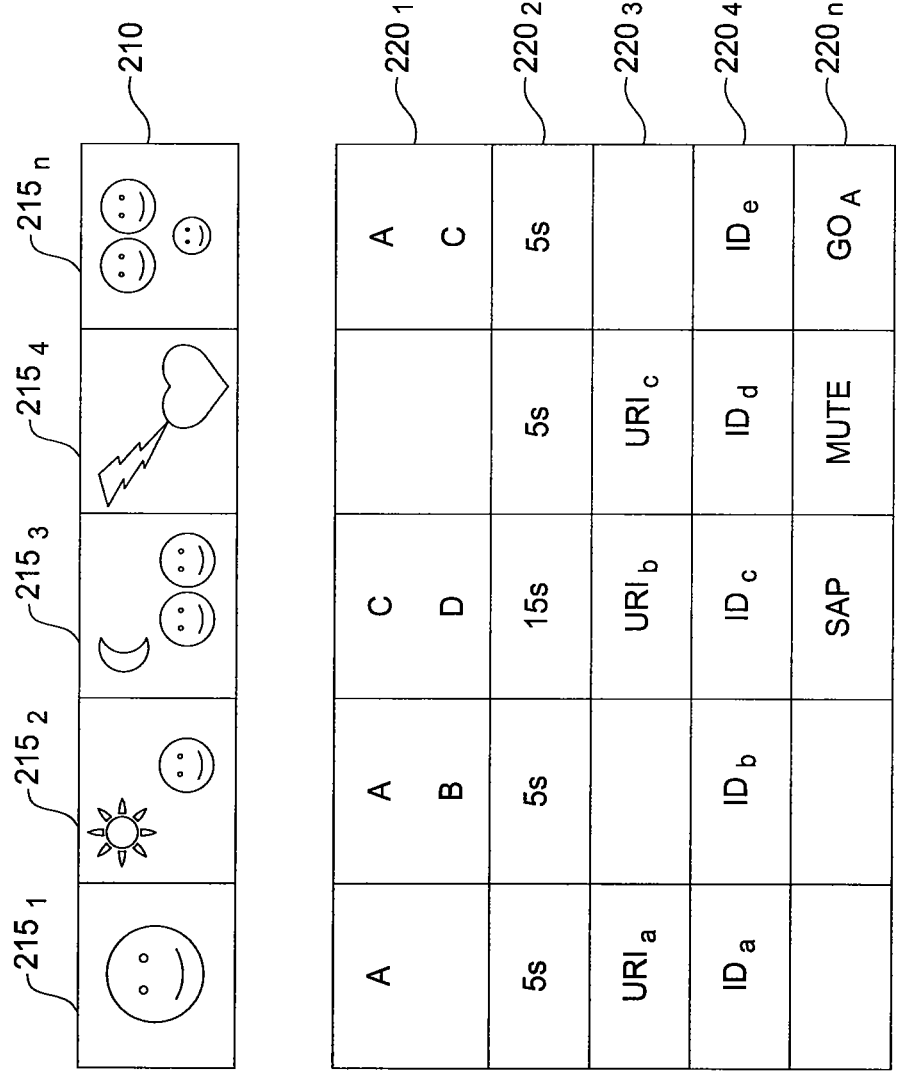
FIG. 2 illustrates an exemplary media comprised of a plurality of distinct parts.

In one embodiment, the primary media 110 (or individual components thereof) and the secondary media 120 (or items of supplemental content thereof) each have associated metadata. For example, as depicted in FIG. 2, an exemplary media 210 (which may be a primary media or a secondary media) is comprised of a plurality of distinct parts $215_1$-$215_n$ (hereinafter collectively referred to as "parts 215") (e.g., where the parts 215 may be components of a primary media or items of supplemental content of a secondary media). Each part 215 of the media 210 is associated with a plurality of types of exemplary metadata $220_1$-$220_n$ (hereinafter collectively referred to as "metadata 220"). In the embodiment illustrated in FIG. 2, five types of metadata 220 are illustrated as being associated with a distinct part 215 of the media 210: descriptive metadata $220_1$, timing metadata $220_2$, linking metadata $220_3$, identifier metadata $220_4$, and player control metadata $220_n$.

Descriptive metadata $220_1$, for example, describes characteristics of a given part 215 of the media 210, such as the subject matter conveyed by the part 215. In the example illustrated in FIG. 2, substantive descriptive metadata $220_1$ is associated with the first three parts $215_1$-$215_3$ and the last part $215_n$ of the media 210, and no descriptive metadata is associated with the fourth part $215_4$. In some embodiments, descriptive metadata $220_1$ is classified according to terms taken from a constrained vocabulary, and such constrained vocabulary terms are also used to index a library of related content. In this way, one avoids the issue of synonyms, so that, for example, a descriptive metadata term of "love" and a descriptive metadata term of "amour" are unified into a single descriptive metadata term "romance."

Figure 5:
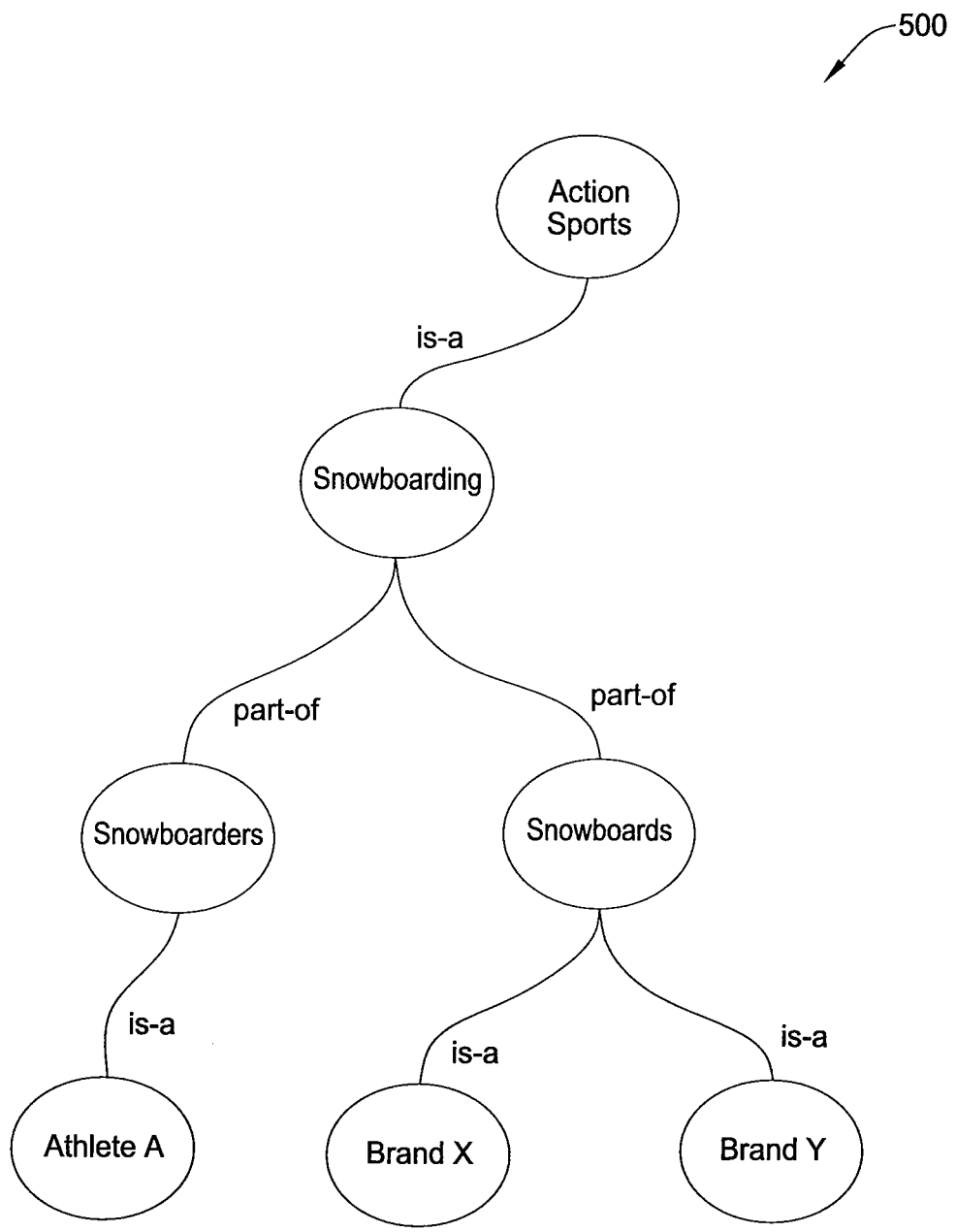
FIG. 5 is a diagram illustrating a simple exemplary ontology.

In further embodiments, descriptive metadata terms are considered to be instances and classes of an ontology. The ontology provides a universe of possible metadata terms that are classes (abstract groups, sets, or collections of objects) and instances (both concrete objects such as specific cars and abstract objects such as numbers, words, and themes). Instances are members of a class (e.g., a "Brand X four-wheel drive truck" is an instance of the class "truck"). In one embodiment, classes are arranged in a graph, providing at least an "is-a" relationship (i.e., an instance "is-a" member of the class, and a class "is-a" member of a super-class). An "is-a" relationship creates a hierarchical taxonomy. Each object (class or instance) in the ontology has one or more attributes associated with it. For example, the class "business" may have an attribute of "location." In some ontology-based embodiments, a "part-of" relationship, sometimes known as a meronymy relationship, is also provided between classes (or between instances and classes), representing how objects (or classes of objects) combine together to form a composite object. For example, the instances "Jelly" and "Peanut Butter" are both "part-of" the instance "Peanut Buffer and Jelly Sandwich." The ontology structure allows more than one parent node, under both the "is-a" relationship and the "part-of" relationship, creating a directed acyclic graph of instances and classes. FIG. 5, for example, is a diagram illustrating a simple exemplary ontology 500. The ontology 500 depicts particular instances and classes relating to winter sports, together with "is-a" relationships between the objects.

Referring back to the exemplary media 210 of FIG. 2, timing metadata $220_2$ specifies a time period for which each part 215 of the media 210 should be displayed (unless such timing parameters are changed by a user such as by "pausing," "fast-forwarding," "rewinding," "stopping," or "restarting" the primary media, or are overridden by player control metadata $220_n$ described below). In certain embodiments, timing metadata $220_2$ is implicit in the media 210 itself (or part 215 thereof) (e.g., a media that is displayed at a rate of certain number of frames per second), and does not constitute a distinct item of metadata 220.

Linking metadata $220_3$ comprises one or more uniform resource identifiers (URIs). For example, URIs for accessing a database of books include Web uniform resource locators (URLs), international standard book numbers (ISBNs), and international standard serial numbers (ISSNs); URIs for accessing a database of audiovisual works include international standard audiovisual numbers (ISANs), international standard musical work codes (ISWCs), international standard music numbers (ISMNs), international standard recording codes (ISRCs), and international standard text codes (ISTCs); and URIs for accessing a database of products include global trade identification numbers (GTINs) or universal product codes (UPCs). In the example illustrated in FIG. 2, linking metadata $220_3$ is associated with the first part $215_1$, the third part $215_3$, and the fourth part $215_4$ of the media 210, and no linking metadata $220_3$ is associated with the second part $215_2$ or the last part $215_n$. The linking metadata $220_3$ may address an external Web site that, for example, provides further information or provides an opportunity to conduct a commercial transaction.

In one embodiment, each part 215 of the media 210 has an item of identifier metadata $220_4$ associated with it. In some embodiments, the entire media 210 is associated with a single item of identifier metadata $220_4$, either in addition to or in place of the items of identifier metadata $220_4$ associated with the individual parts 215 of the media 210. Where two media are associated with each other (for example, a primary media and a secondary media), an additional item of identifier metadata $220_4$ may be associated with the combined media. For example if a primary media with item of identifier metadata $PM_a$ is associated with a secondary media consisting of three parts, with items of identifier metadata $SM_a$, $SM_b$, and $SM_c$, the items of identifier metadata $A_{a,a}$, $A_{a,b}$, and $A_{a,c}$ could represent the associations of the primary media with the three parts of the secondary media. If the secondary media as a whole was associated with an item of identifier metadata $SM_{abc}$, then an item of identifier metadata $A_{a,abc}$ could be assigned to the association of the primary media with the secondary media as a whole. In this way, it is possible to address (e.g., provide a URI for) an individual media, an association of media, or a part of a media. For example, a primary media which is associated with an item of identifier metadata $PM_a$ could be accessed by a Web URL of "http://sitename/getmedia.phpid=$PM_a$." A primary media having an assigned item of identifier metadata $PM_{a\ and}$ associated with a secondary media having an assigned item of identifier metadata $SM_{abc}$ could be accessed by a Web URL of "http://sitename/getmedia.phpprimary=$PM_a$,secondary=$SM_{abc}$," or by using the item of identifier metadata of the association between the primary media and the secondary media (e.g., http://sitename/getmedia.phpassoc=$A_{a,abc}$).

As items of identifier metadata for parts of a media define a region within the media, the items of identifier metadata may be used to access just the defined parts of the media, or to start display of the media at a point other than the natural beginning of the media. For example, if a primary media A is associated with a secondary media B consisting of three parts X, Y, and Z, then one could retrieve the primary media A and start playback of the primary media A at a time at which the association with the secondary media component Y begins by using a "start" URL of "http://sitename/getmedia.phpassoc=$A_{a,xyz}$,start=Y." Further, one could restrict display of the primary media A to just that part of the primary media A with which component Y of the secondary media B is associated, for example, by using a "region" URL "http://sitename/getmedia.phpassoc=$A_{a,xyz}$, region=Y." In certain embodiments of tools for displaying media, a facility is provided that will generate a start URL or region URL such as those described on demand. For example, a user may request a start URL (e.g., when a media is playing or paused) that may be used as a link on a Web page or blog, or that may be sent by email to other users, such that retrieval of the URL would display the media, cued to start at the position within the media at which the user requested generation of the URL. In other embodiments, this URL generation tool may also, or instead, generate player control metadata, for use as described in further detail below.

In one embodiment, each part 215 of the media 210 is also associated with an item of player control metadata $220_n$ that directs an operation of a media player used to display the media. In one embodiment, the player control metadata $220_n$ includes secondary audio program (SAP) (directing the player to use the SAP track of the media 210), MUTE (directing the player to turn off the sound), and GO (directing the player to seek to a location of the media 210 represented by identifying metadata or by a time). In further embodiments, player control metadata $220_n$ directs a media player to play a second media (e.g., to display a second primary media once display of a first primary media is completed). Where a primary media is associated with a secondary media, the secondary media may contain player control metadata $220_n$ that may be interpreted by a media player that directs how the media player should display the primary media (e.g., by reference to identifiers or timing information of the primary media). For example, the associated secondary media may contain player control metadata $220_n$ that is interpreted by a media player such that the media player causes only a portion of the primary media to be displayed, causes parts of the primary media to be displayed in a particular out-of-sequence order, or causes the primary media to start at a position other than its beginning.

Figure 3:
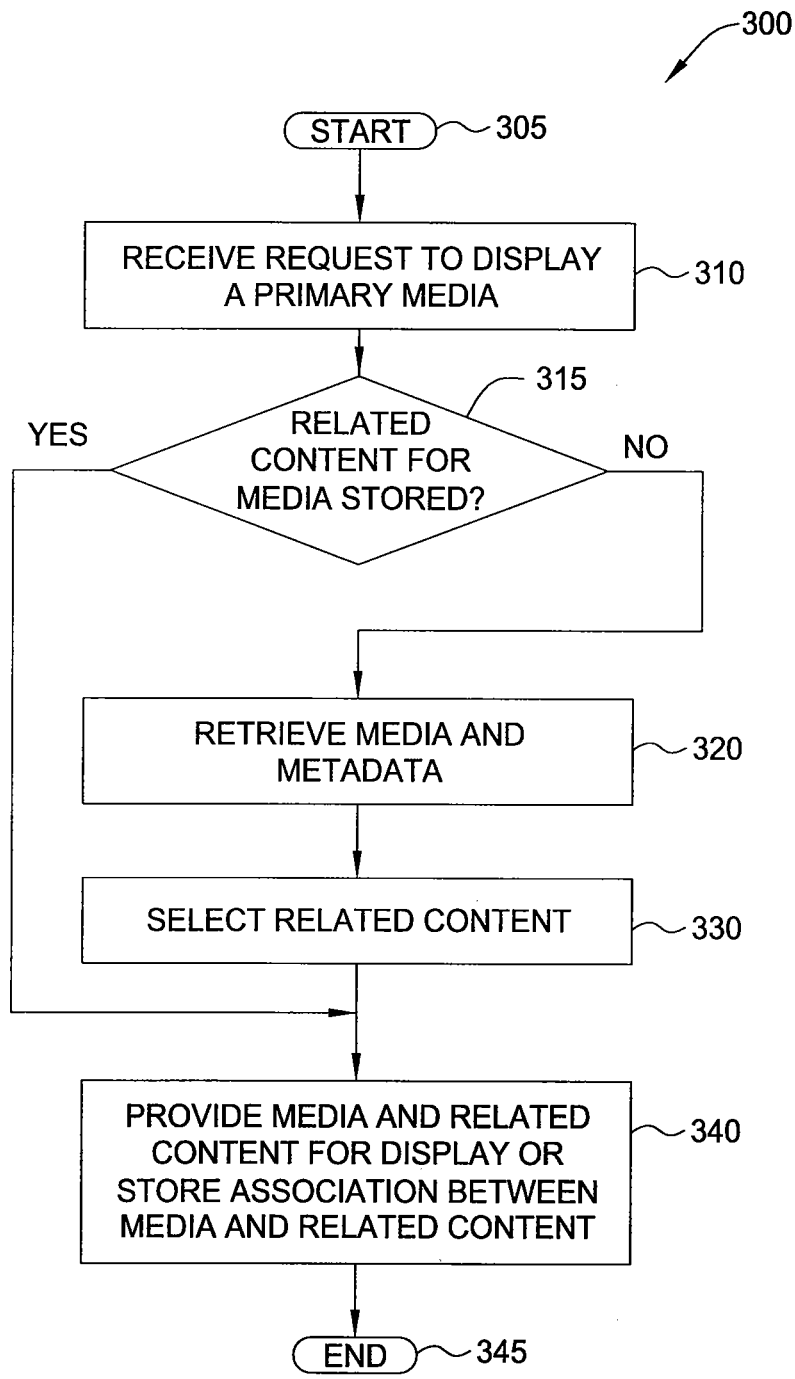
FIG. 3 is a flow diagram illustrating one embodiment of a method for selecting and displaying related content in conjunction with a primary media, according to the present invention.
Figure 4:
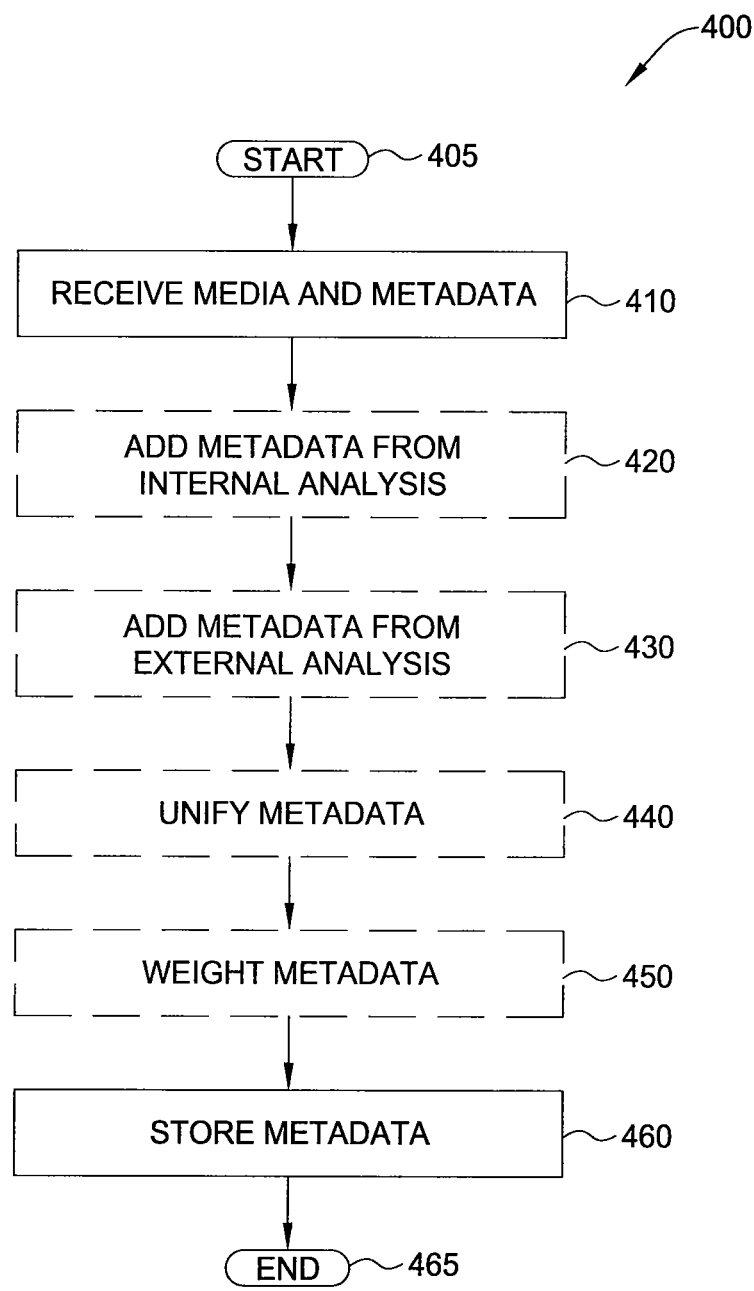
FIG. 4 is a flow diagram illustrating one embodiment of a method for associating descriptive metadata with a media, according to the present invention.

Metadata 220 may be obtained in a variety of ways, as discussed in greater detail with respect to FIG. 4. First, and to help in providing context, a method for selecting related content based on the metadata associated with a media is discussed in connection with FIG. 3.

FIG. 3 is a flow diagram illustrating one embodiment of a method 300 for selecting and displaying related content in conjunction with a primary media, according to the present invention. The method 300 is initiated at step 305 and proceeds to step 310, wherein a request is received from a user to display a primary media (e.g., a request to watch a video).

In step 315, the method 300 determines whether a set of related content has already been stored for the primary media. In various embodiments, the method 300 is performed either in advance of display or on-demand at display time, and is performed on the computer displaying the media and related content, on a remote computer, or on a combination of the two. In embodiments where the selection of related content has been performed in advance (i.e., steps 320 and 330, discussed in further detail below, have been previously performed for a media and the results thereof stored), the method 300 skips ahead from step 315 to step 340 and provides the media and related content for display. In some embodiments, partial advance performance may be used, where any calculation that depends on characteristics of the viewing user (e.g., demographics, computer type, and location) or the Web page hosting the video is postponed until viewing time.

If selection of related content has not been performed in advance, the method 300 proceeds from step 315 to step 320 and retrieves the requested primary media, any associated secondary media (collectively, "the media"), and metadata previously associated with the media, or components thereof. In one embodiment, the metadata is weighted (i.e., has been assigned a value representing a degree of "relatedness" to the media), which is used in step 330 as discussed in greater detail below. In one embodiment, where the request received in step 310 contains an instruction to only play a portion of the primary media (e.g., a region URL as described above) or to start display at a time other than the beginning of the primary media (e.g., a start URL as described above), associated secondary media and metadata previously associated with the media (or components thereof) are retrieved only for those parts of the primary media which will be displayed (e.g., are within the region requested, or are after the start time requested).

In some embodiments, step 320 may retrieve more than one media, where the method 300 is tasked with determining a related content to be displayed in conjunction with more than one media (e.g., a set of media posted to a blog). Step 320 may unify the metadata across the set of media, and step 330 may proceed based on the single, unified set of metadata. In other embodiments, step 330 is performed for each media independently, and then a choice process is used to select between the respective related content. The choice process may select the related content based on the highest weighted or most popular of selected related content, the related content that is related to the most recently posted media, the related content that is related to the most popular media, and the like. In some embodiments, the choice process selects a related content for each media, and the corresponding related content is displayed in response to a viewing user's selection of one of the media (e.g., playing the media).

At step 330, the method 300 selects at least one item of related content from a library of related content, to be displayed in conjunction with the media. Related content may be any form of content, including text, images, animations, videos, multimedia presentations, and advertising copy. Related content may also be a composite document (e.g., an HTML file that includes several subcomponents, such as an image of an advertisement coupled with a link to a Web site).

In one embodiment, the library of related content is indexed by the same terms used to describe metadata. In such an embodiment, an item of related content is selected directly from the library by using an item of metadata (e.g., the highest weighted (most relevant) item of associated metadata that was received at step 320).

In some embodiments, where the library contains more than one item of related content as indexed by the metadata, step 330 uses specific demographic, behavioral, or other forms of information about the user when selecting the related content. The information about the user may comprise information obtained from the user as part of the request for display of the primary media (e.g., in accordance with step 310), information stored in connection with the user's previous interactions (e.g., previous requests for display or previous interactions with other related content), or information obtained from a user profile designed to obtain the user's demographic information (e.g., age, gender, location, household income) and content preferences. In further embodiments, information about the user's "virtual" location is considered in the selection of related content. For instance, a Web site being viewed by the user and on which the media is displayed may yield information that is helpful in selecting the related content to display (e.g., a web page displaying information pertaining to California and skiing, as opposed to New Jersey and hiking).

Consideration of user information in step 330 allows the method 300 to select between items of related content that are tagged by their suitability for particular demographics, locations, and the like. For example, a particular item of related content may be tagged for distribution to California only (e.g., an advertisement for a store that only has branches in the state of California), and thus would be inappropriate for display to a user residing in New Jersey. Selection or rejection of this item of related content can thus be made more effective by accounting for the user's location. As a further example, if the user is known to be a child, his or her age (or the binary under-eighteen/eighteen-and-over) can be considered when selecting between a first item of related content, which is tagged as suitable for children (e.g., information pertaining to a toy) or a second item of related content, which is tagged as purely adult subject matter (e.g., information pertaining to a purchase opportunity for a luxury sports car). Similarly, if the prior viewing history of a given user is known to include a high proportion of primary media that relate to "European football," this information may be used to select between a first item of related content with the subject of "American football" and a second item of related content with the subject "soccer."

In further embodiments, the selection of related content is influenced by feedback in the form of user responses to particular items of related content. For example, assume that in a first invocation of step 330, a first set of related content was chosen. In a second invocation of step 330, a second set of related content is chosen. User interaction (e.g., clicking on an item of related content or consummation of a commercial transaction) with the first set and the second set of related content is monitored across a plurality of viewings, and the results are stored. In a third invocation of step 330, the method 300 determines, by reference to the user interaction data, which of the first set and the second set of related content resulted in a more favorable user response (e.g., higher click-through rate or more profitable commercial transactions). The method 300 then selects, in the third invocation of step 330, whichever of the first set or the second set of related content resulted in the more favorable response.

For example, the first set and the second set of related content may each be shown to one hundred users, where the first set results in forty percent of the users engaging in a commercial transaction, and the second set results in seventy-four percent of the users engaging in a commercial transaction. Subsequent selection of related content at step 330 would thus choose the second set of related content, with the goal of increasing revenue from commercial transactions. In one embodiment, stored user response data is purged at periodic intervals (e.g., daily, weekly, or monthly), and new user response data is collected and stored based on potentially new selections of related content. In an alternative embodiment, the stored user response data is aged, such that older data (e.g., data collected more than one month ago) is not accounted for in the selection process. In some embodiments, more than two sets of related content may compete in this manner for subsequent selection. In further embodiments, the user response data is also made available for use in assigning weights in a metadata selection process, as described in further detail with respect to step 450.

In further embodiments, user response data in the form of "flags" is considered. For example, users may be empowered with the ability to flag related content that is associated with a media as "irrelevant." In further embodiments still, users are invited to provide their reasoning for flagging an item of related content as irrelevant to the media. If an item of related content has been flagged as "irrelevant" by a threshold number of users, the method 300 may opt to not select the item of related content for use in future displays of the media.

In some embodiments, the method 300 appeals to an ontology to assist in the selection of related content. For example, an ontology may be consulted in order to determine more specific and more general related content with respect to an item of metadata, by examining the superclass and subclass/instance relationships. For instance, given an item of metadata "luxury purses," in a particular ontology, more specific related content may include "Brand X luxury purses," and more general related content may include "luxury women's fashions." In particular embodiments, step 330 is biased towards selection of more specific or more general related content. In other embodiments, step 330 employs feedback from user responses to determine whether direct, specific, or general content produces higher user interest.

For example, consider a media that has two associated items of descriptive metadata: "Brand X Snowboards" and "Athlete A." Using the ontology 500 depicted in FIG. 5, the ontology 500 can be "walked" to find the minimal common class shared between the two metadata (i.e., "Snowboarding"). The metadata also match at the higher-level class "Action Sports." Related content associated with either of these common classes may thus be selected in step 330. The selection between the competing choices can be made by appealing to other features as described herein, or by using the lower-level (more specific) common class, as the lower-level common class is likely to be more relevant to the subject matter of the media than the more abstract unifying concept embodied in the higher-level common class.

In some embodiments, step 330 involves the selection of a single set of items of related content that will simultaneously be displayed with the media. For example, the items of related content making up the set may be simultaneously displayed on a Web page with a video, and those items of related content will remain until the user navigates to a different Web page. Alternatively, more than one set of related content may be selected (e.g., one set for each component of the media, such that different set of related content is displayed with each component of the media). To create more than one set of related content, step 330 is performed for each part of a media and its associated metadata, rather than for the media as a whole.

At step 340, the method 300 either provides the user with the media and the selected related content (e.g., by providing a Web page that incorporates the media and the selected related content in a form suitable for display by a standard Web browser), or stores the association between the media and related content for later display. To speed up subsequent invocations of the method 300, the association is stored (cached) as well as being provided to the user.

The method 300 then terminates at step 345.

In one embodiment, media and related content are stored by a single party who subsequently provides the media and related content as a destination page (e.g., Web site) displaying the media and related content. The control of the single party allows for pre-computation of the association of each media with related content, and straightforward provision of the media and related content together in one hypertext markup language (HTML) page. In contrast, in other embodiments, media may be posted to a venue (e.g., Web site, blog, or social media site) that is not under the control of the single party. Enabling display of related content in conjunction with media posted on third-party controlled sites may be facilitated by having the related content "embedded" with the media (e.g., provided together as an extensible markup language (XML) object which the Web page or application thereon can parse and display), or by providing a small "reader code" (e.g., application or a link to a Web service) that the third-party in control of a page may include in the page (or page template) and which will be substituted by the related content when executed.

In some embodiments, the reader code may also be configured to read metadata from the media and/or related content, or to access metadata relating to the media and/or related content remotely. Thus, the reader code may use the metadata to select ("target") additional related content, such as advertisements, in some embodiments using the method 300 described above. The reader code may similarly use the metadata to customize other aspects of the Web page (e.g., by selecting a cascading style sheet (CSS)), and thereby control the typeface, color, images, and generally customize the look and feel to be consistent or complementary to the media and related content. The reader code is therefore completely prepared to interact with (e.g., target additional content based on) any media and related content that may be posted on a Web site. Widespread use of the reader code will enable targeting in almost any venue in which the media and related content are displayed (i.e., wherever the media and related content go, targeting may be performed). This will allow media monetization to effectively leverage the emerging need to access an audience rather than simply aggregate it. In other words, the paradigm used to be that the audience would come to the source of the content, and would be monetized there. Increasingly, the content is coming to the audience. It is currently very challenging, however, to monetize access of this type.

Thus, in certain embodiments of the method 300, descriptive metadata associated with a media drives the selection of related content (so that the related content is relevant to the user). In some embodiments, such as those described in further detail with respect to FIG. 4, the invention provides methods for selecting descriptive metadata for association with a media and parts thereof, which may be used as input to the method 300. Such embodiments involve at least three major sources of descriptive metadata: (1) descriptive metadata provided by a user or content creator (e.g., tags); (2) descriptive metadata derived from results of an analysis of the media and parts thereof (internal analysis); and (3) descriptive metadata derived from results of an analysis of a target of any "linking" metadata (external analysis).

FIG. 4 is a flow diagram illustrating one embodiment of a method 400 for associating descriptive metadata with a media, according to the present invention. The method 400 is initiated at step 405 and proceeds to step 410, where a media is received (e.g., from a user or content creator). In one embodiment, one or more items of metadata (e.g., descriptive, linking, or timing) are already associated with the media, in which case the one or more items of metadata are also received at step 410.

In one embodiment, step 410 provides the opportunity for a user or content creator to directly provide descriptive metadata, for example by typing in metadata terms, or selecting metadata terms from a constrained vocabulary (e.g., selected from a drop-down menu). In one embodiment, the method 400 prompts the user or content creator to provide metadata in the form of a "tag" that describes a given part of the media or the media as a whole.

In optional step 420 (illustrated in phantom), the method 400 analyzes the media received in step 410 to identify descriptive metadata for association with the media that can assist the content creation process, particularly the selection of secondary media. In one embodiment, descriptive metadata is derived from at least a portion of the content of the media (internal analysis) such as, for example, calculating the dominant color of an image displayed in a portion of the media (e.g., a close up image of a sunflower) to derive color-related metadata (e.g., yellow is determined to be the dominant color of the primary media component, hence the analysis in step 420 generates the descriptive metadata item "yellow"). In one embodiment, deeper content analysis involves the application of speech recognition techniques to identify words and phrases contained in an audio track of the media. Using speech recognition techniques, common words and phrases can be eliminated, leaving words and phrases that are more likely to be indicative of the content of at least a portion of the media. In other embodiments, deeper content analysis involves the use of optical character recognition (OCR) techniques to identify words displayed in a video track or an image of the media, such as in accordance with the methods taught in U.S. Pat. Nos. 7,031,553 and 7,333,676, both to Myers et al., the contents of which are hereby incorporated by reference in their entireties. In further embodiments still, the OCR techniques may be applied to the text of a Web page on which the media is to be displayed, and recognized text on the Web page may used in identifying descriptive metadata.

In another embodiment, the method 400 derives descriptive metadata from information associated with elements that have been used to create a part of the media. For example, if a part of the media comprises an image with an audio track, the image may have been constructed by compositing portions of various photographs from a photography Web site, and the audio track may have been added from a database of digital audio files. On the photography Web site, each photograph may have associated descriptive tags, and in the database of digital audio files each file may have an associated artist, album, and/or song name. In such an embodiment, the part of the media is associated with descriptive metadata comprising the union of the descriptive tags for the composited photographs and the artist and/or song name for the audio track.

For example, if the media comprised: (1) a first image having a tag of "brandX_snowboard" from a first Web site and incorporated as a foreground image of an image part of the media; (2) a second image having a tag of "utah_skiresortY" from a second Web site and incorporated as a background image of the image part of the media; and (3) an audio track associated with an artist name of "artistA" and a track name "songB" from a third Web site and incorporated as an audio track part of the media, then the media will be assigned descriptive metadata comprising the tags of the several elements (i.e., {brandX_snowboard, utah_skiresortY, artistA, songB}).

In optional step 430 (illustrated in phantom), the method 400 analyzes a target of any provided linking metadata to identify descriptive metadata (external analysis). As described earlier, linking metadata provides a pointer (e.g., URI) to an external data source, such as a database or a Web page, the contents of which are analyzed in step 430. The derivation of descriptive metadata from linking metadata associated with the media follows the inference that linking to an external data source inherently indicates some relevance of the external data source to the subject matter of the media. For example, if a part of a media has an embedded Web URL such that when a user clicks on the part, a Web page is loaded regarding "dog training" (i.e., it is known that the extrinsic data source pertains to "dog training"), then the part of the media can thereby be identified as relating to "dog training" and have descriptive metadata referring to "dog training" associated therewith. This then allows a user to quickly identify that at least that part of the media is related to "dog training."

In some embodiments, in addition to analyzing a target of a linking metadata, step 430 also includes analysis of a source of a link to the media. For example, a Web crawler database may indicate that an external data source (e.g., a Web page) contains a URL link to at least a part of the media (e.g., using a start URL or a region URL as described earlier). The Web page that contains the link may be analyzed in the same manner as external data sources contained in linking metadata for the media. The linking word or phrase (e.g., as contained within an HTML anchor tag) may be given special weight when compared to the general content or topic of the source as a whole. In some embodiments, the linking word or phrase is added to the descriptive metadata associated with the media, and a URL of the source Web page is added to the linking metadata associated with the media.

An external data source may be specially tagged (e.g., by means of a particular expression in a markup language such as XML, or by one or more HTML meta tags) to provide a set of descriptive metadata. In such case, the provided set of descriptive metadata may be added to the descriptive metadata associated with the linked part of the media.

If an external data source contains text (e.g., a Web page), the subject matter or other characteristics of such Web page may be determined by extracting the words from the text source (e.g., by "scraping" the Web page). As with extraction of information from a media itself by speech or OCR (described above), common words may be excluded to leave terms more likely to be descriptive of content.

Descriptive metadata may also be derived by appealing to a categorization of an external data source (e.g., by a Web directory). For example, Open Directory Project (ODP) is a multilingual open content directory of Web links that uses a hierarchical ontology scheme for organizing site listings, such that listings on a similar topic are grouped into categories and subcategories. Using such a directory, an external data source can be characterized using a category or categories into which the extrinsic data source is assigned. For example, if the ODP places an external data source (e.g., a Web page) in the category "Adventure Travel," and the subcategory "Africa," the external data source is thereby identified as relating to African adventure travel, and the descriptive metadata "Adventure Travel" and "Africa" is added to the descriptive metadata associated with the linked part of the media.

In other embodiments, other sources of information are used to categorize an external data source. For example, a set of most common search terms that a searcher uses to locate the external data source in a search engine will usually characterize the content of the external data source well. For example, if forty-eight percent of visitors to a Web page arrived immediately after typing "brandX snowboards" into a search engine, and another twenty-seven percent of visitors arrived to the Web page after typing in "snowboard equipment," it may be inferred that the Web page pertains to "snowboarding."

In one embodiment, if the above methods of extracting descriptive metadata fail to produce a sufficient (predetermined) number of items of descriptive metadata, the method 400 appeals to sources linked from (or to) the external data source or to sources similar to the external data source.

If the external data source (e.g., a first Web page) links to (or is linked to by) a further data source (e.g., Web pages linked from the first Web page), the above methods may be recursively applied to the further data source. In one embodiment, a predetermined limit is exercised on the recursion, as the more links between the data source and the further data source, the more attenuated the relationship is likely to be to the media. For example, if a Web page of interest contains hyperlinks to a number of other Web pages that are each known to relate to "gourmet cooking," then it can be inferred that the Web page of interest also relates to "gourmet cooking." In one embodiment, the recursive analysis is refined to consider only selected links from a Web page, such as hyperlinks embodied in the Web page that have been "clicked" by no fewer than a predetermined percentage of all prior users of the Web page, inferring that popular links provide a more accurate and reliable indication of relevancy. For example, although a given Web page includes a relatively high number of hyperlinks that are associated with an external data source relating to "gourmet cooking," if a single hyperlink (say, a hyperlink that leads to a Web page that is specifically about "how to cook a turkey") has been clicked upon by a disproportionate number of users, this convergence of user attention suggests that gourmet cooking information that relates specifically to turkeys may be most relevant (i.e., visitors to the Web page who expect to find information regarding how to cook a turkey are likely to have their expectations fulfilled and, thus, the information is likely to produce higher user click-through rates).

Further, if a second external data source is known to be similar to a first external data source, analysis may be performed on the second external data source in order to identify descriptive metadata in place of (or in addition to) analysis of the first external data source. For example, external data sources categorized similarly by a directory or having similar patterns of linking to further external data sources may be used, such that if a first external data source is similar to a second external data source that is identified as relating to "airplanes," then it may be inferred that the first external data source also relates to "airplanes." If analysis of a first external data source is indeterminate or results in a prediction with a relatively low statistical confidence level, then similar analyses may be conducted across a broad range of identified "similar" external data sources to potentially reveal more definitive and/or reliable descriptive metadata.

In optional step 440 (illustrated in phantom), the method 400 unifies the collected descriptive metadata. The unification step may reduce redundancy in the set of metadata (e.g., different terms that reflect the same concept) and may also add redundancy to the set (e.g., by adding an additional item of descriptive metadata representing a concept that encompasses more than one of the collected items of descriptive metadata).

In one embodiment, a set of items of descriptive metadata (e.g., "high blood pressure," "aspirin," and "exercise") is unified by reference to an ontology, to determine if one or more of the various elements are subsumed under a common class (e.g., "heart disease"). If a common class is identified, the class name of the common class may be added to the set of items of descriptive metadata or may replace the names of the individual items contained therein.

In optional step 450 (illustrated in phantom), the method 400 assigns weights to each item of descriptive metadata associated with the media. In one embodiment, these weights are assigned in accordance with one or more of the approaches described in further detail below. In any particular embodiment, each of these approaches is given a different emphasis in the weighting calculation. In embodiments where step 450 is skipped, each item of descriptive metadata is assumed to have equal weight.

Following the steps of the method 400 described above typically results in multiple items of descriptive metadata being associated with each part of a media. As such, it is beneficial to determine which elements of such association should be assigned the greatest significance with respect to selection of related content, as described earlier herein. For example, if application of the various approaches above generates the set of descriptive metadata: {"high blood pressure," "aspirin," "exercise"} (with "aspirin" being generated as the output of two different approaches), it is beneficial to determine which of the three items of descriptive metadata in the set should be given primacy (i.e., should be more heavily "weighted"). In one embodiment, greater weighting is given to an item of descriptive metadata that is generated by more than one different approach, under the assumption that repeated results are more likely to be a reliable indicator of content when compared to results that are produced from only one approach. For example, since two approaches (e.g., scraping a linked external data source and speech recognition) each identified "aspirin" in the example above, "aspirin" is weighted more highly than "high blood pressure" and "exercise."

In one embodiment, items of descriptive metadata are weighted according to the types of information that they convey. For example, items of descriptive metadata pertaining to proper names (e.g., "BrandX ModelY automobile") may be weighted more heavily than items of descriptive metadata pertaining to general categories (e.g., "sports car" or "land vehicle"). In embodiments utilizing an ontology, for example ontology 500 depicted in FIG. 5, the weighting can be reduced across each is-a relationship. For example, consider a situation in which four items of descriptive metadata have been produced, one item of which is "Athlete A," and three items of which are of "Brand X snowboards." The weights may be assigned to the nodes of the ontology as follows: "Athlete A" (weight 1) and "Brand X" (weight 3). These weights are then propagated up the class hierarchy in the ontology, but reduced as they propagate to reflect the potential lower relevance of the enclosing category. In one embodiment, the factor by which the weights are reduced as they propagate is initially assigned at the time the ontology structure is devised and is modified through feedback from user-interaction with related content (e.g., users making a commercial transaction). Particular nodes in the ontology may also have "boost factors," such that any weight assigned to or propagated through that node is multiplied by the boost factor, increasing the likelihood of selection.

A further example of weighting involves accounting for feedback from user viewing activity. As a media is deployed and viewed, users are given various opportunities to interact with the media (e.g., the items of supplemental content in the secondary media) and/or related content. Such interaction can include clicking on the media and/or related content to retrieve more information or to make a purchase. Where subsequent processes collect data regarding click-rates, purchases (including size of purchase and any commission paid to the referring party), and the like, these subsequent processes implicitly provide a measure of the "success" of the association. This measure can be used to weight particular descriptive metadata more highly.

In particular embodiments, a collection of descriptive metadata may be weighted according to the collection's relationship to the media as a whole, rather than the collection's relationship with the part of the media with which the collection is associated. Such a weighting scheme may be advantageous in situations in which a single item of related content will be chosen for display alongside the media for its entire duration (as opposed situations in which different items of related content are displayed alongside each part of the media). In such embodiments, weighting accounts for one or more of: a relative time of each part of the media, the ordering of the parts of the media, user behavior in partially-viewing the media, and whether the part of the media represents a commercial opportunity. These scenarios are described in greater detail below, in the context of the example media 200 of FIG. 2.

In one embodiment, when descriptive metadata is weighted for an entire media, priority is given to an item of descriptive metadata that is associated with a relatively long time component of the media. For example, in the example illustrated in FIG. 2, the descriptive metadata $220_1$ may be weighted by the aggregate of the timing metadata $220_2$ that corresponds to item of each descriptive metadata $220_1$. In the example of FIG. 2, the time-weighting of A=15, B=5, C=20, D=15, makes item C of the descriptive metadata 220 the highest weighted. In particular embodiments, short parts of a media (e.g., where the part consumes a short absolute period of time or a small fraction of the entire time) are excluded from the calculation, as short parts are likely to be less representative of and/or relevant to defining the overall theme of the media as a whole.

Although the lengths of time that parts of a media are displayed can be used as one measure in a weighting scheme, in other embodiments weighting is based on the order in which the parts of the media are presented. One intuition supporting this weighting scheme is that the "first impression" components of the media are likely to be more important in determining the overall subject matter of the media, and hence more useful to drive selection of related content. Various automatic approaches are described below, and they may be overridden by a content creator selection if, for example, the content creator knows the most relevant part of the media with respect to related content selection is at a point other than that which would be automatically selected.

An order-weighting assigns a decreasing weight factor to each subsequent part of the media, thus increasing the relevance weight of earlier descriptive metadata and decreasing the relevance of later metadata. The weighting applied may be linear, such that in the example of FIG. 2, the descriptive metadata $220_1$ that is matched with the first part $215_1$ of the media 210 is assigned a weight of 5; the second part $215_2$, a weight of 4; the third part $215_3$, a weight of 3; the fourth part $215_4$, a weight of 2; and the last part $215_n$, a weight of 1. The time period represented by each part 215 of the media 210 is then multiplied by the corresponding weighting, giving a weighted time (in the example above, the weighted times are 25 seconds, 20 second, 45 seconds, 10 seconds, 5 seconds, respectively) and a time-weighted relevance of the descriptive metadata $220_1$ (in the example above, the time-weighted relevances are A=50, B=20, C=50, and D=45, respectively). Compared to the basic time-relevance approach described above, A and C are now considered equally relevant (due to A's appearance earlier in the sequence). Such linear assignment of weights to consecutive components is replaced in some embodiments by a non-linear assignment of weights (e.g., decaying weights such as 64, 32, 16, 8, 4, 2, 1, which give much higher emphasis on the earlier parts of the video).

Where timing metadata indicates that the media's parts are of unequal length (e.g., as in the example of FIG. 2), one or more of the parts of the media may be split into smaller sub-parts prior to the assignment of weights. In this manner, the order-weighting will decay more consistently with time. For instance, in the example of FIG. 2, the middle part (i.e., part $215_3$) may be split into three five-second sub-parts, each of the sub-parts being associated with the same metadata. Ordering-weights of 7, 6, 5, 4, 3, 2, and 1 may then be applied, resulting in a subpart-order-weighted relevance of A=70, B=30, C=65, and D=60, making the A the most relevant (compared to C being the most relevant under the time-weighted approach described above, and A and C being equal under order-weighted approach).

In some embodiments, the weighting further accounts for user behavior. For example, where users are observed to view only the early, middle, or later part of a media, the weighting can be correspondingly adjusted to assign higher weights to those portions of the media that are most-viewed. For instance, if it becomes known that the end of a media is of more interest to the user community (e.g., the "funny part" of a particular video is displayed in the last two minutes), reverse order-weighting can be used. For a middle section, a bell-curve like approach can correspondingly weight the middle parts of a media more highly than the early or later parts of the media. Further, user behavior may be considered on the basis of a "class" of media rather than on a per-media basis. For example, if users typically view snowboarding-related videos for an average of forty seconds, but view surfing-related videos for an average of eighty seconds, even if no user behavior data is available for a particular media being analyzed, the user behavior in viewing media of the same class may be substituted. Similarly, user behavior may be considered on a "per site" basis, for example, if media is distributed on more than one Web site. Average user behavior on a first site (e.g., a video distribution Web site) and on a second site (e.g., postings to personal blogs) may be quite different, and by obtaining information about the posting destination, average behavior on that site (or class of sites) may be considered.

In some embodiments, where user behavior data shows that users have abandoned viewing a media after an average time, t, descriptive metadata associated with the parts of the media occurring after time t are likely to be of very low relevance in selecting related content. In such circumstances, it would be beneficial to exclude from consideration the metadata that is associated with the parts of the media that are displayed after time t (i.e., weight the metadata at zero rather than at a low weighting).

In certain embodiments, parts of a media may be identified as being of one or more types, with certain types resulting in higher weightings being assigned to their associated metadata than other types. For example, one type of part represents a commercial item and a second type of part represents merely a graphic image for creative impact. An exemplary commercial item part comprises an advertisement (which, for example, is clicked on to provide a purchase opportunity) for a particular product. An exemplary creative part comprises a video regarding "how to" perform a snowboarding trick. Although the creative part provides some context from which to infer the related content, it is more likely that the commercial part would provide better information for the selection of related content (e.g., advertising). Hence, metadata associated with a commercial part is weighted more heavily than metadata associated with creative parts, resulting in a type-weighted relevance calculation that, for example, weights metadata associated with commercial parts by a factor of two, or may ignore creative parts entirely (weight by a factor of zero).

Weightings may also be content creator-supplied. For example, a content creator may provide weightings of zero for all but one particular item of metadata, providing sharp focus for the related content selection process. Similarly, a content creator may assign specific weights to each item of metadata, or to each part of a media, to provide guidance to the selection process (i.e., that certain items of metadata or parts of the media are more or less relevant to the selection of related content than are others). For example, the content creator may be prompted to rank each part of a media (and, by inference, rank the metadata that is associated with each part) according to one or more different criteria (e.g., "rank the items from most important to least important, with respect to facilitating the identification of the substantive content of this video by a search engine" or "rank the items from most important to least important, with respect to identifying related advertising content that is most likely to elicit a commercial transaction").

In step 460, the association between the media (or parts of the media) and the metadata, computed by the earlier steps of method 400, is stored. The association may be represented by embedding the metadata in the media (or the parts of the media), by storing the association in a file or database (either local or remote), or a combination thereof.

The method 400 terminates in step 465.

Once a media is associated with one or more items of metadata by the methods described above, this enables additional functionality of search, notifications, and suggestion of secondary media for association with a primary media. Metadata may also be applied as a set of keywords for use with existing methods of targeting related content such as advertising (rather than using words extracted from a Web page), either in addition to or instead of the selection methods described earlier.

Metadata associated with a media may be used to enable more effective searching of media by subject matter. For example, combining a URI analysis with a time-weighted analysis may suggest that a media relates to a topic of "snowboarding." By providing the topic to a search function, the search function can return more relevant results than could be obtained merely by using user-supplied tags and a title of the media. The metadata may be made available for access and indexing by search engines in one or more HTML meta tags within a Web page hosting the media, or by including the metadata in the text of the Web page. Further, as analysis may be performed for each part of a media, such HTML meta tags may include information that "snowboarding" is a topic of the media during a first part from time t=thirty seconds to time t=seventy-eight seconds, and that "skiing" is a topic of the media during a second part from time t=seventy-nine seconds to t=one hundred ten seconds, and may further provide start or region URLs (as described earlier) for direct access to the first and/or second part of the media.

As discussed above, the selection of related content may be based on metadata that indicates a relationship or relevance between the primary media and a secondary media. However, the selection of related content may also rely on information about the primary media itself, apart from the relationship to the secondary media. For example, one may determine from examining the primary media and/or secondary media that a user should be presented with advertisements depicting a famous snowboarder demonstrating a new model of snowboard. In this case, it may also be useful to determine the "dominant colors" of the primary media, so that the displayed advertisements reflect a complementary color scheme.

A system's users could also sign up for a notification when a new media is added to the system that matches subject matter of interest, such that when the new media is associated with one or more items of metadata corresponding to the subject matter of interest, a notification (e.g., email) is sent to the user. In particular embodiments, the notification also involves additional information, such as user interaction statistics (e.g., notify of media associated with metadata of "soccer" that have been viewed at least 10,000 times and for which associated related content is generating user click-throughs at a rate of greater than fifty percent). Such notification would facilitate, for instance, the identification of a primary media with a subject matter of particular interest to a particular user that also has very effective advertising as secondary media, enabling a content creator to learn from the success of others. Similarly, a content creator could request notification for cases where a secondary media is not maximizing the commercial potential of the primary media. For example, an expert in skateboard-related advertising may request notifications about skateboard-related videos that are currently generating user click-throughs of secondary media or related content in the bottom quartile of click-through data for that category of media, and offer to assist (e.g., for a fee or a share of the profits) the primary media's uploading content creator.

Metadata associated with a media may be used to enable a "suggestion" tool to guide a content creator's selection of one or more items of supplemental content as a secondary media to accompany a primary media. For example, if a primary media is known to be a video relating to fashion, a suggestion tool can search a set of items of supplemental content and retrieve those items of supplemental content that are related to fashion as suggested supplemental content. By appealing to an ontology that describes relationships between descriptive metadata, the suggestion tool can further provide a function to browse ontologically-related supplemental content in a more specific and/or less specific fashion, for example as one would browse the parent and subfolders in a file explorer.

As a further example, a first primary media relating to fashion may be provided, and may have an associated secondary media comprising supplemental content related to shoes, purses, and belts. If a second primary media is uploaded and identified as relating to "fashion," a suggestion tool may suggest that the supplemental content associated with the first primary media be used by the content creator with respect to the second primary media. Similarly, within a primary media, supplemental content could be suggested to the content creator for later components based on the associations with earlier components.

As an additional enhancement, user interaction data can be used to enhance the creation process. For example, suggested supplemental content may be ranked (or a "top ten" or similar list provided) based on a measure of performance of user interaction (e.g., generating a higher rate of user click-through), and a content creator may be notified of the potential to modify his or her selections to reflect this information. User demographics may also be included, so that a content creator is either provided with information such as "matching the following three items of supplemental content with your primary media will likely be effective when presented to users under the age of thirty" or is given the option to filter the suggested items by the content creator's assumptions of the demographics of the likely audience (e.g., assuming that a primary media will appeal most to males ages eighteen to twenty-five).

The automated assist functionality may also provide additional, context-specific information regarding the creation of highly compelling related content. For example, by reviewing user interaction data relating to "similar" videos (e.g., as determined by comparing the highest ranked descriptive metadata), a system may suggest more effective supplemental content. For instance, the system would be able to provide suggestions such as: "Videos with this subject matter that are likely to be viewed by teenagers are likely to be more effective if only twenty to twenty-five percent of the supplemental content relates to advertising and when the items featured are priced between seven and fifteen dollars." This type of data would allow the dissemination of "best practices" across many content creators and tend to create a virtuous cycle in which effective advertising creates a data set of user responses to guide the creation of even more effective advertising.

In some embodiments of the present invention, means are provided for analyzing media (or media/related content combinations) for predetermined/pre-specified standards of appropriateness. For example, a given media and/or its associated related content may violate the terms of use or other standards applied to a Web site to which the media is posted. For example, the associated content may include URLs to Web sites containing content that is illegal or prohibited (e.g., Web sites related to fraudulent activities or to spam) or may contain more than a threshold amount of commercial or advertising material. If a given media (or media/related content combination) combination is found to be potentially inappropriate for display in a given venue, an individual associated with that venue (e.g., an administrator or moderator) may be notified that he or she should review the media/related content combination.

Figure 6:
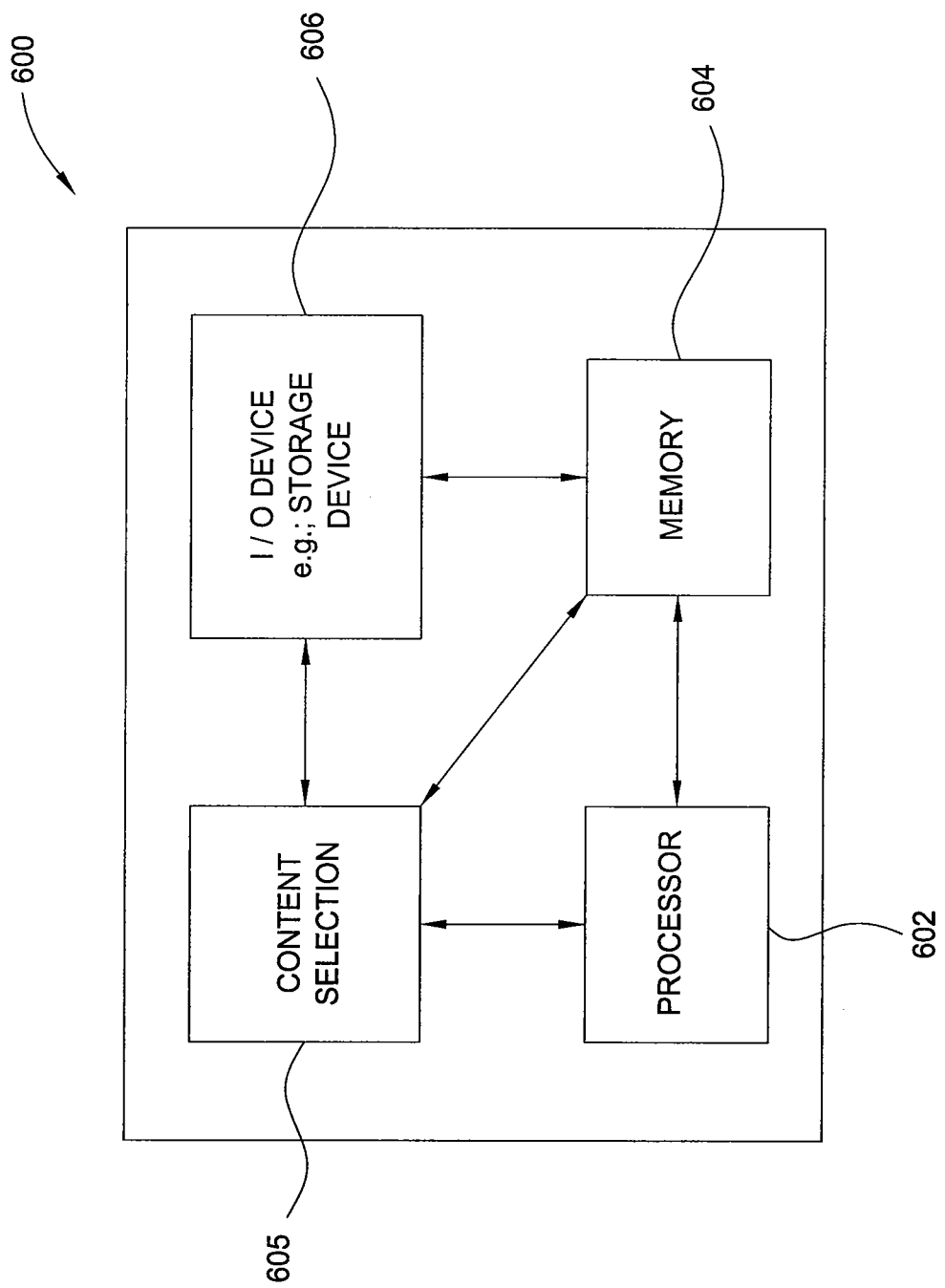
FIG. 6 is a high level block diagram of the related content selection method that is implemented using a general purpose computing device.

FIG. 6 is a high level block diagram of the related content selection method that is implemented using a general purpose computing device 600. In one embodiment, a general purpose computing device 600 comprises a processor 602, a memory 604, a related content selection module 605 and various input/output (I/O) devices 606 such as a display, a keyboard, a mouse, a modem, a network connection and the like. In one embodiment, at least one I/O device is a storage device (e.g., a disk drive, an optical disk drive, a floppy disk drive). It should be understood that the related content selection module 605 can be implemented as a physical device or subsystem that is coupled to a processor through a communication channel.

Alternatively, the related content selection module 605 can be represented by one or more software applications (or even a combination of software and hardware, e.g., using Application Specific Integrated Circuits (ASIC)), where the software is loaded from a storage medium (e.g., I/O devices 606) and operated by the processor 602 in the memory 604 of the general purpose computing device 600. Additionally, the software may run in a distributed or partitioned fashion on two or more computing devices similar to the general purpose computing device 600. Thus, in one embodiment, the related content selection module 605 for associating, storing and viewing related content of a video described herein with reference to the preceding Figures can be stored on a computer readable medium or carrier (e.g., RAM, magnetic or optical drive or diskette, and the like).

It should be noted that although not explicitly specified, one or more steps of the methods described herein may include a storing, displaying and/or outputting step as required for a particular application. In other words, any data, records, fields, and/or intermediate results discussed in the methods can be stored, displayed, and/or outputted to another device as required for a particular application. Furthermore, steps or blocks in the accompanying Figures that recite a determining operation or involve a decision, do not necessarily require that both branches of the determining operation be practiced. In other words, one of the branches of the determining operation can be deemed as an optional step.

Although various embodiments which incorporate the teachings of the present invention have been shown and described in detail herein, those skilled in the art can readily devise many other varied embodiments that still incorporate these teachings.

What is claimed is:

1. A method for selecting related content for display in conjunction with a media, wherein the media comprises a primary media and a secondary media, the secondary media being time-synchronized with the primary media, the method comprising:
retrieving one or more items of metadata associated with at least one part of the media, wherein at least one of the one or more items of metadata indicates a non-hierarchical relationship between content of the primary media and content of the secondary media, and wherein the content of the primary media is different from the content of the secondary media;

selecting at least one item of related content based at least in part on the at least one of the one or more items of metadata, wherein the at least one item of related content is selected from a library of related content that is indexed by one or more terms used to describe the one or more items of metadata, wherein the selecting comprises:
identifying the at least one item of related content as an item of related content that is indexed by a first term, where the first term matches a second term used to describe at least one of the one or more items of metadata; and displaying the at least one item of related content substantially simultaneously with display of the media.

2. The method of claim 1, wherein the selecting comprises:
identifying the at least one item of related content as an item of related content that is related by an ontology to the one or more items of metadata, where the ontology groups items of related content including the at least one item of related content into a plurality of classes and indicates types of relationships between the plurality of classes and the one or more items of metadata are matched to at least one of the plurality of classes.

3. The method of claim 1, wherein the at least one item of metadata comprises at least one of: an item of descriptive metadata describing at least one characteristic of the at least one part of the media, an item of timing metadata specifying a time period for which the at least one part of the media is to be displayed, an item of linking metadata comprising one or more uniform resource identifiers, an item of identifier metadata, and an item of player control metadata used to control operation of a media player on which the media is to be displayed.

4. The method of claim 1, wherein the one or more items of metadata are weighted in accordance with a degree of relatedness to the at least one part of the media.

5. The method of claim 1, wherein the selecting further comprises:
accounting for information about a user to which the media and the related content are to be displayed.

6. The method of claim 1, wherein the selecting further comprises:
accounting for information regarding responses of users to previous viewings of the at least one item of related content.

7. The method of claim 1, wherein the one or more items of metadata are derived from at least one of: user-provided metadata, analysis of the at least one part of the media, and analysis of one or more targets of linking metadata.

8. A non-transitory computer storage medium containing an executable program for selecting related content for display in conjunction with a media, wherein the media comprises a primary media and a secondary media, the secondary media being time-synchronized with the primary media, where the program performs steps of:
retrieving one or more items of metadata associated with at least one part of the media, wherein at least one of the one or more items of metadata indicates a non-hierarchical relationship between content of the primary media and content of the secondary media, and wherein the content of the primary media is different from the content of the secondary media;

selecting at least one item of related content based at least in part on the at least one of the one or more items of metadata, wherein the at least one item of related content is selected from a library of related content that is indexed by one or more terms used to describe the one or more items of metadata, wherein the selecting comprises:
identifying the at least one item of related content as an item of related content that is indexed by a first term, where the first term matches a second term used to describe at least one of the one or more items of metadata; and displaying the at least one item of related content substantially simultaneously with display of the media.

9. The computer storage medium of claim 8, wherein the selecting comprises:
identifying the at least one item of related content as an item of related content that is related by an ontology to the one or more items of metadata, where the ontology groups items of related content including the at least one item of related content into a plurality of classes and indicates types of relationships between the plurality of classes and the one or more items of metadata are matched to at least one of the plurality of classes.

10. The computer storage medium of claim 8, wherein the at least one item of metadata comprises at least one of: an item of descriptive metadata describing at least one characteristic of the at least one part of the media, an item of timing metadata specifying a time period for which the at least one part of the media is to be displayed, an item of linking metadata comprising one or more uniform resource identifiers, an item of identifier metadata, and an item of player control metadata used to control operation of a media player on which the media is to be displayed.

11. The computer storage medium of claim 8, wherein the one or more items of metadata are weighted in accordance with a degree of relatedness to the at least one part of the media.

12. The computer storage medium of claim 8, wherein the selecting further comprises:
accounting for information about a user to which the media and the related content are to be displayed.

13. The computer storage medium of claim 8, wherein the selecting further comprises:
accounting for information regarding responses of users to previous viewings of the at least one item of related content.

14. The computer storage medium of claim 8, wherein the one or more items of metadata are derived from at least one of: user-provided metadata, analysis of the at least one part of the media, and analysis of one or more targets of linking metadata.

15. A system for selecting related content for display in conjunction with a media, wherein the media comprises a primary media and a secondary media, the secondary media being time-synchronized with the primary media, the system comprising:
means for retrieving one or more items of metadata associated with at least one part of the media, wherein at least one of the one or more items of metadata indicates a non-hierarchical relationship between content of the primary media and content of the secondary media, and wherein the content of the primary media is different from the content of the secondary media;

means for selecting at least one item of related content based at least in part on the at least one of the one or more items of metadata, wherein the at least one item of related content is selected from a library of related content that is indexed by one or more terms used to describe the one or more items of metadata, wherein the means for selecting comprises:

means for identifying the at least one item of related content as an item of related content that is indexed by a first term, where the first term matches a second term used to describe at least one of the one or more items of metadata; and means for displaying the at least one item of related content substantially simultaneously with display of the media.

16. The method of claim 1, wherein the displaying is performed on a same computer performing the selecting.

17. The method of claim 1, wherein the displaying comprises:

generating a markup document comprising a link to the media and a link to the related content; and providing the markup document to a remote computer for display.

18. The method of claim 1, wherein the at least one item of related content is at least one of: text, an image, an animation, a video, a multimedia presentation, an Internet functionality, and an advertisement.

19. The computer storage medium of claim 8, wherein the displaying is performed on a same computer performing the selecting.

20. The computer storage medium of claim 8, wherein the displaying comprises:

generating a markup document comprising a link to the media and a link to the related content; and providing the markup document to a remote computer for display.

21. The computer storage medium of claim 8, wherein the at least one item of related content is at least one of: text, an image, an animation, a video, a multimedia presentation, an internet functionality, and an advertisement.

* * * * *

UNITED STATES PATENT AND TRADEMARK OFFICE
CERTIFICATE OF CORRECTION

PATENT NO. : 8,793,256 B2  Page 1 of 1
APPLICATION NO. : 12/343947
DATED : July 29, 2014
INVENTOR(S) : John P. McIntire and David W. J. Stringer-Calvert It is certified that error appears in the above-identified patent and that said Letters Patent is hereby corrected as shown below:

In the specification
Column 5, line 43, Delete "Buffer" and insert -- Butter --, therefor.
Column 6, line 38, Delete "phpid" and insert -- php?id --, therefor.
Column 6, line 42, Delete "phpprimary" and insert -- php?primary --, therefor.
Column 6, line 45, Delete "phpassoc" and insert -- php?assoc --, therefor.
Column 6, line 56, Delete "phpassoc" and insert -- php?assoc --, therefor.
Column 6, line 60, Delete "phpassoc" and insert -- php?assoc --, therefor.
In the claims
Column 24, line 3, In Claim 18, delete "Internet" and insert -- internet --, therefor.

Signed and Sealed this
Eighth Day of December, 2015

Michelle K. Lee
*Director of the United States Patent and Trademark Office*